Patented May 1, 1923.

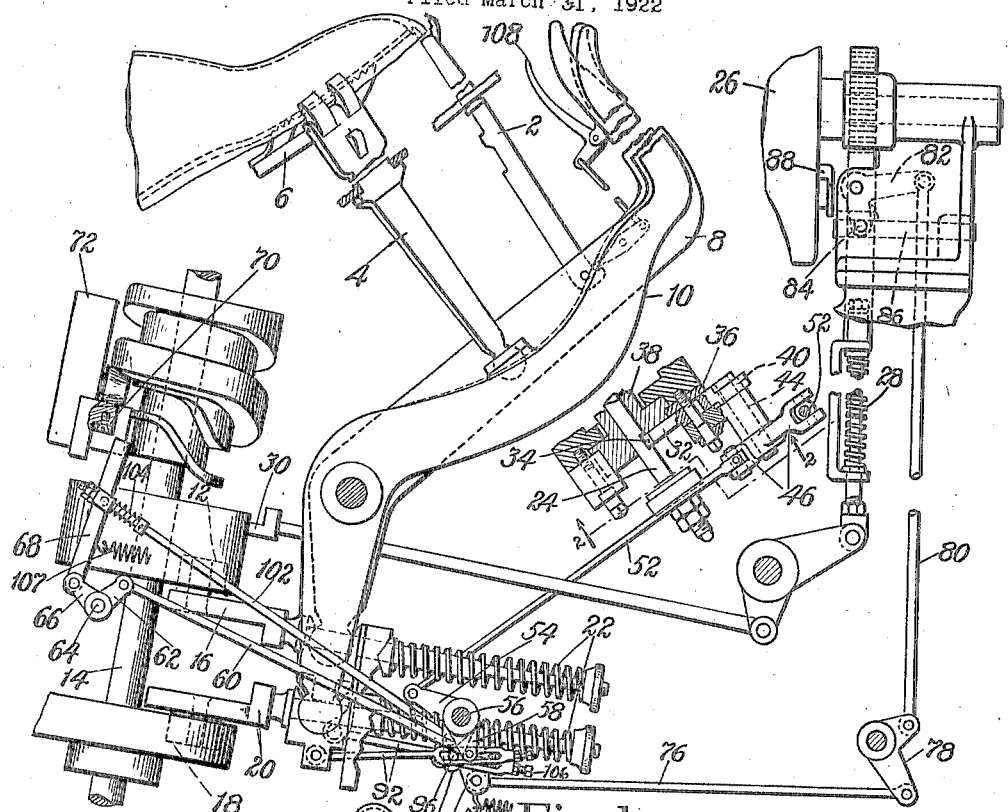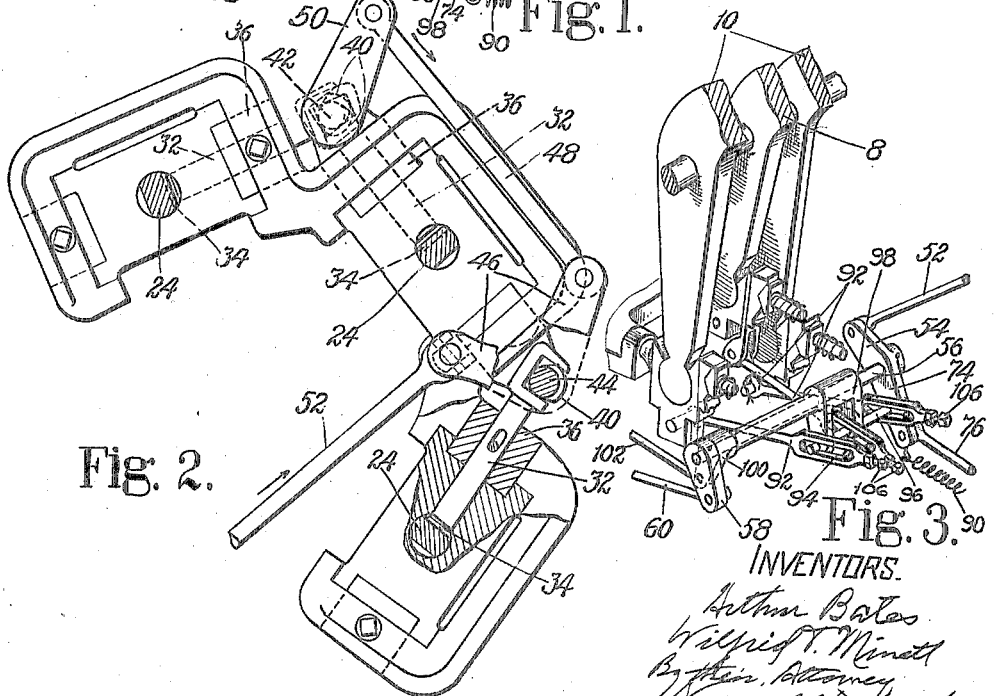

1,453,263

UNITED STATES PATENT OFFICE.

ARTHUR BATES AND WILFRID THOMAS MINETT, OF LEICESTER, ENGLAND, ASSIGNORS TO UNITED SHOE MACHINERY CORPORATION, OF PATERSON, NEW JERSEY, A CORPORATION OF NEW JERSEY.

PULLING-OVER MACHINE.

Application filed March 31, 1922. Serial No. 548,452.

*To all whom it may concern:*

Be it known that we, ARTHUR BATES and WILFRID T. MINETT, subjects of the King of England, residing at Leicester, Leicestershire, England, have invented certain Improvements in Pulling-Over Machines, of which the following description, in connection with the accompanying drawings, is a specification, like reference characters on the drawings indicating like parts in the several figures.

This invention relates to pulling-over machines including in their organization upper pulling means and upper fastening means, and has for an object to prevent the fastening of the upper except under normal upper pulling conditions, as well as to prevent wasteful discharge of fastenings in case the machine is operated in the absence of a shoe.

In a prior application of Bernhardt Jorgensen, Serial No. 232,238, filed on May 3, 1918 and owned by the assignee of the present invention, upon which Patent No. 1,430,559 was granted on Oct. 3, 1922, there was disclosed an organization including mechanism controlled by one of the side gripper levers for preventing the operation of the fastening means in the event of movement of that lever beyond the position which it normally assumes with the upper under proper tension. In the use of that machine the operator would observe the condition of the work at the end of the upper pulling movement of the grippers, and in the event of any abnormal condition such as to render it necessary to release the shoe and begin the work over again, for example when one of the grippers had failed to grip the upper, or had slipped on the upper, or for any other reason had failed to apply the proper tension, he would be under the necessity of tripping at least that gripper which controls the fastening, unless that particular gripper had failed to grip or pull the upper properly, before again starting the machine to complete the cycle. It is a particular object of the present invention to afford still further insurance against the fastening of an upper which has not been properly pulled, as well as to relieve the operator of labor which has been necessary for him to perform heretofore under such abnormal conditions. To this end, a feature of the invention consists in a novel organization wherein the upper fastening mechanism is automatically controlled to prevent the fastening of the upper under abnormal upper pulling conditions in respect to any one of a plurality of upper pulling devices, preferably comprising at least those devices where abnormal conditions are most likely to occur in the pulling of the upper, thus insuring against improper fastening of the upper in case the operator should fail to notice an abnormal condition in respect to the pull at any point, and in any event rendering it usually unnecessary to release the upper manually from any of the grippers before running the machine through the remainder of its cycle. In the construction shown the upper fastening means is arranged to be controlled by either of the side grippers or by the toe gripper, so that the driving of fastenings or their discharge will be prevented in case any one of these grippers should fail to grip the upper or should slip unduly on the upper, or in case there should be too little upper pulling tension applied through any one of the grippers by reason, for example, of the manner in which the grippers may engage an improperly cut upper. It is a further advantageous characteristic of the construction herein shown, wherein the upper fastening mechanism is under control of the toe gripper as well as the side grippers, that in case the operator should desire for any reason to remove the shoe from the machine without fastening the upper, even though conditions are not such that the fastening would be automatically prevented, he is enabled very readily to condition the machine for completing its cycle without operating the fastening means by releasing the toe gripper from the upper through the convenient and easily manipulated releasing device with which the toe gripper of a machine of the type illustrated is commonly provided.

The above and other features of the invention, including various details of construction and combinations of parts, will now be more particularly described by reference to the accompanying drawings and pointed out in the claims.

The invention is herein illustrated as embodied in mechanism which is in many respects similar in construction to that shown and described in said Jorgensen patent, but which embodies various novel details which present useful advantages, and the invention is further illustrated in its application to a pulling over machine of the so-called "inverted" type, the characteristic features of which are shown and described in a prior application of Arthur E. Jerram and Joseph Gouldbourn Serial No. 380,874, filed on May 12, 1920. It will be recognized, however, that the invention is applicable to various types of pulling-over machine organizations.

In the drawings:

Fig. 1 shows in side elevation and partly in section as much of a pulling-over machine of the type above mentioned as it is necessary to show for an understanding of the present invention, with mechanism embodying the features of the invention applied thereto;

Fig. 2 is a view partly in inverted plan and partly in section substantially on the line 2—2 of Fig. 1, showing the several tack driver bars and their locking devices, and Fig. 3 is a perspective view showing the rear ends of the several gripper levers with associated parts of the mechanism for controlling the fastening means.

As more fully set forth in said prior Jerram and Gouldbourn application, machines of the type illustrated include in their organization a toe gripper 2 and opposite side grippers 4 which are arranged to engage the upper of a shoe presented bottom downward on a sole rest 6, the toe gripper being connected to a gripper lever 8 and the side grippers to levers 10. Operative movement is imparted to the toe gripper lever 8 by a cam 12 on the main cam shaft 14 through connections including a cam slide 16, and operative movement is imparted similarly to the side gripper levers 10 by a cam 18 through a cam slide 20, springs 22 being arranged to transmit the movements of the cam slides 16 and 20 yieldingly to the gripper levers. It will be understood that upon the starting of the machine the toe and side grippers are automatically operated to grip the upper and then to pull it over the last under yielding tension dependent upon the resistance encountered at the toe and at the opposite sides of the shoe, the different gripper levers moving different distances in accordance with such differences in resistance, and that the machine comes automatically to a stop with the upper under tension. The operator is then permitted to observe the condition of the work and to make any adjustment that may be required, for example to straighten the tip, and the machine will then be started again and will complete its cycle. In this later stage of the cycle the upper fastening tacks will be driven at the toe and at the opposite sides of the forepart by the operation of the usual front and side tack driver bars 24, the tacks being fed automatically from the usual tack hopper 26 which is oscillated by a cam slide 30 through yielding connections including a spring 28.

In order to prevent the driving or discharge of tacks under abnormal conditions the several tack driver bars 24 are arranged to be locked against driving movement by means of slide rods 32 which are arranged to engage the driver bars in notches 34 with which said bars are provided, each of the slide rods 32 being mounted in one of the two cylindrical blocks 36 which afford bearings for the associated tacker arm 38. At their outer ends the slide rods 32 are forked to embrace cams 40 by which they are controlled, two of these cams being fast on a shaft 42 to control the slide rods associated respectively with the front driver bar and with one of the side driver bars and the other cam being fast on a shaft 44 for controlling the slide rod for the other side driver bar. The shafts 42 and 44 are mounted in bosses formed on two of the cylindrical blocks 36 above referred to. Fast on the shaft 44 is a bell-crank 46 one arm of which is connected by a link 48 to an arm 50 on the shaft 42. The other arm of the bell-crank 46 is connected by a link 52 to an arm 54 which is fast on a rock shaft 56 mounted in a position near the rear ends of the gripper levers. Another arm 58, which is also fast on the rock shaft 56, is connected by a link 60 to an arm 62 fast on a rock shaft 64 which has thereon another arm 66 to which is pivotally connected an operating member 68. The member 68 is arranged to be engaged and operated, when conditions are such as to require the suppression of the tacking operation, by a block 70 fast on a cam slide 72 which in the type of machine illustrated receives a downward movement in the second stage of the cycle of the machine. It will be understood that when the member 68 is in position to be operated by the slide 72, such operation of the slide will serve to turn the rock shaft 56 and through the connections above described to move the slide rods 32 into the notches 34 in the front and side driver bars 24, thus locking the bars against driving movement during the completion of the cycle of the machine.

In order to prevent the feeding of tacks to the tack drivers when the drivers are rendered inoperative, the rock shaft 56 carries an arm 74 connected by a link 76 to a bell-crank 78 which is connected in turn by a link 80 to a bell-crank 82, the latter having a pin 84 for operating a slide rod 86 constructed to interlock with a lug 88 on the tack hopper 26 in a manner similar to the construction shown in said Jorgensen patent. It will be understood that the rock shaft 56 and its connected parts are returned to their normal positions, when permitted by the return movement of the slide 72, by the action of a spring 90 connected to the arm 74.

Movement of the member 68 into position to be operated by the slide 72 is effected, in the construction shown, by the movement of any one of the three gripper levers beyond the normal range of movement which it receives in subjecting an upper to proper tension. For this purpose the toe and side gripper levers are severally provided with links 92 which are connected to the rear end portions of the levers and at their outer free ends have slots 94 through all of which extends a rod 96 carried by an arm 98 which is loosely mounted on the rock shaft 56. Also loose on the shaft 56, but rigidly connected to the arm 98, is a second arm 100 connected by a link 102 to the member 68 through an interposed spring 104. Each of the links 92 is provided with a set screw 106 which is arranged to engage the rod 96 and is adjustable to determine the point in the movement of the connected gripper lever when said screw will engage and operate the rod. It will be understood that upon engagement of any one of the set screws 106 with the rod 96 and the continued movement of the connected gripper lever beyond the point of such engagement the arms 98 and 100 will be operated to swing the member 68 yieldingly toward the left (Fig. 1) into position to be operated by the downward movement of the slide 72. Upon the subsequent starting of the machine the mechanism hereinbefore described for preventing the operation of the tack drivers and the feeding of the tacks will thus be automatically operative and the machine will complete its cycle and finally release the shoe without driving or discharging any tacks. A spring 107 returns the member 68 and the arms 98 and 100 to idle position determined by any suitable stop, when permitted by return movement of the gripper levers.

It will be understood from the foregoing description that in the operation of the machine the normal operation of the upper fastening means will be prevented automatically, and without attention from the operator, if either of the side gripper levers or the toe gripper lever moves a substantial distance farther in the upper pulling stage of the cycle than the farthest point which it normally reaches under satisfactory upper pulling conditions. Such abnormal movement of a gripper lever may occur, for example, if the gripper should accidentally fail to grip the upper, or if the gripper should slip on the upper in such manner as to release it or to render the consequent tension applied comparatively ineffective, or further if the upper should be improperly cut or displaced too much toward one side of the last so that a gripper engaging its margin would move too far before beginning to pull effectively. Where any such condition is observed, and cannot be readily corrected by manipulation of the gripper levers, thus rendering it necessary to begin the upper pulling operation over again, the operator has only to run the machine through the remainder of its cycle to bring it back to the starting point, assurance being afforded that no fastening operation will occur and no tacks be discharged. A further important advantage is that even if the operator should fail to notice a condition which is not proper for the subsequent fastening of the upper, no operation of the fastening means will occur, and the necessity sometimes encountered heretofore of removing the pulling-over tacks from the shoe in order to pull the upper over again is thus avoided. If, moreover, none of the undesirable conditions above mentioned is present, but if for any reason the operator should desire to release the shoe without fastening the upper, he has merely to release the toe gripper from the upper by the use of the usual handle 108 on the toe gripper lever 8, whereupon the machine may be started to complete its cycle and release the shoe from the side grippers without driving or discharging any tacks.

As hereinbefore intimated, and as will be evident from the foregoing description, many of the important advantages of the invention are not dependent upon control of the upper fastening means by all of the upper pulling devices, since under some conditions it may be preferable, for example, to control the fastening means by the opposite side grippers only, and the expression "plurality" of upper pulling devices or grippers, or equivalent expressions, as used in the appended claims is not intended to include all the grippers of the machine except where the context requires such interpretation.

Having described the invention, what we claim as new and desire to secure by Letters Patent of the United States is:

1. In a machine of the class described, the combination with a plurality of upper pulling devices for pulling an upper respectively in different locations, and means for fastening the upper, of controlling mechanism for said fastening means automatically operative to prevent the fastening of the upper under abnormal upper pulling conditions in respect to any one of said plurality of upper pulling devices.

2. In a machine of the class described, the combination with grippers for pulling an upper at opposite sides of a last, and means for fastening the upper, of mechanism automatically operative to prevent the operation of said fastening means if either of the side grippers assumes at the end of the upper pulling operation a position materially different from that which it normally assumes in subjecting an upper to proper tension.

3. In a machine of the class described, the combination with a plurality of upper pulling devices for pulling an upper respectively in different locations, and means for fastening the upper, of mechanism arranged to be controlled by different upper pulling devices for preventing automatically the normal operation of said fastening means under abnormal upper pulling conditions in respect to any one of said different upper pulling devices.

4. In a machine of the class described, the combination with a plurality of upper pulling devices for pulling an upper respectively in different locations, and means for fastening the upper, of mechanism arranged to be controlled by different upper pulling devices and to be rendered operative by movement of any one of said different devices beyond its normal range of upper pulling movement to prevent the normal operation of said fastening means during the completion of the cycle of the machine.

5. In a machine of the class described, the combination with upper pulling means comprising a plurality of yieldingly operated gripper levers arranged to assume different positions in accordance with differences in resistance of the upper, and means for fastening the upper, of mechanism arranged to be rendered operative by any one of said gripper levers independently to prevent automatically the operation of said fastening means under abnormal conditions in respect to the pulling of the upper by that lever.

6. In a machine of the class described, the combination with upper pulling means comprising a plurality of gripper levers, and means for fastening the upper, of links connected to the different respective gripper levers, and a member arranged to be moved by any one of said links into position to prevent the normal operation of said fastening means during the remainder of the cycle of the machine in the event of movement of any one of said gripper levers beyond its normal range of upper pulling movement.

7. In a machine of the class described, the combination with grippers for pulling an upper at opposite sides of a last, and means for fastening the upper, of mechanism arranged to be rendered operative in response to movement of either of said opposite side grippers beyond its normal range of upper pulling movement to prevent the operation of said fastening means during the completion of the cycle of the machine.

8. In a machine of the class described, the combination with grippers for pulling an upper at opposite sides of a last, and fastener driving devices for fastening the upper, of mechanism arranged to be rendered automatically operative to lock said fastener driving devices against driving movement if either of the side grippers assumes at the end of the upper pulling operation a position indicative of too little tension on the upper.

9. In a machine of the class described, the combination with a plurality of grippers for pulling an upper in different locations in one stage of the cycle, and means for fastening the upper in a later stage of the cycle, of controlling mechanism for preventing automatically the operation of said fastening means, said controlling mechanism being dependent for its operation upon the absence of a predetermined degree of upper tensioning stress in the location of any one of said grippers.

10. In a machine of the class described, the combination with a plurality of gripping devices for pulling an upper respectively at the toe end and at opposite sides of a last, and automatic means for fastening the upper in a later stage of the cycle of the machine, of mechanism for preventing automatically the normal operation of said fastening means during the completion of the cycle, and means arranged to be controlled by each of said toe and side gripping devices independently of the others to render said mechanism operative in the event of movement of any one of said gripping devices beyond the position which it normally assumes in properly pulling an upper.

11. In a machine of the class described, the combination with a plurality of upper pulling devices for pulling an upper respectively in different locations, and mechanism comprising driver bars for driving fastenings to fasten the upper, of members movable into or out of position to lock said driver bars against driving movement, a power operated member for moving said locking members into locking position, and mechanism arranged to be controlled by different upper pulling devices for operatively connecting said power member to the locking members in the event of movement of any one of said upper pulling devices to a position different from that which it normally assumes in subjecting an upper to proper tension.

12. In a machine of the class described, the combination with grippers for gripping and pulling an upper respectively at the toe end and at opposite sides of a last, levers for operating said grippers, and means for subsequently fastening the upper, of mechanism arranged to be controlled by said toe and side gripper levers to prevent the normal operation of said fastening means if any one of said grippers releases the upper, and a device on the toe gripper lever arranged to be manipulated by the operator to release the toe gripper from the upper.

13. In a machine of the class described, the combination with a plurality of upper pulling devices for gripping and pulling an upper respectively in different locations, and means for fastening the upper, of mechanism arranged to be controlled by said different upper pulling devices and to be rendered operative by movement of any one of said devices beyond its normal range of upper pulling movement to prevent the operation of the fastening means during the completion of the cycle of the machine, and means for adjustably varying the points in the movement of the different upper pulling devices when they become effective to control said mechanism.

14. In a machine of the class described, the combination with means for pulling an upper over a last, of upper fastening means comprising a plurality of driver bars, slide rods mounted for movement into notches in said driver bars to lock said bars against driving movement, cams for controlling said slide rods, and connections between said cams for operating them in unison.

In testimony whereof we have signed our names to this specification.

ARTHUR BATES.
WILFRID THOMAS MINETT.